United States Patent Office 3,526,469
Patented Sept. 1, 1970

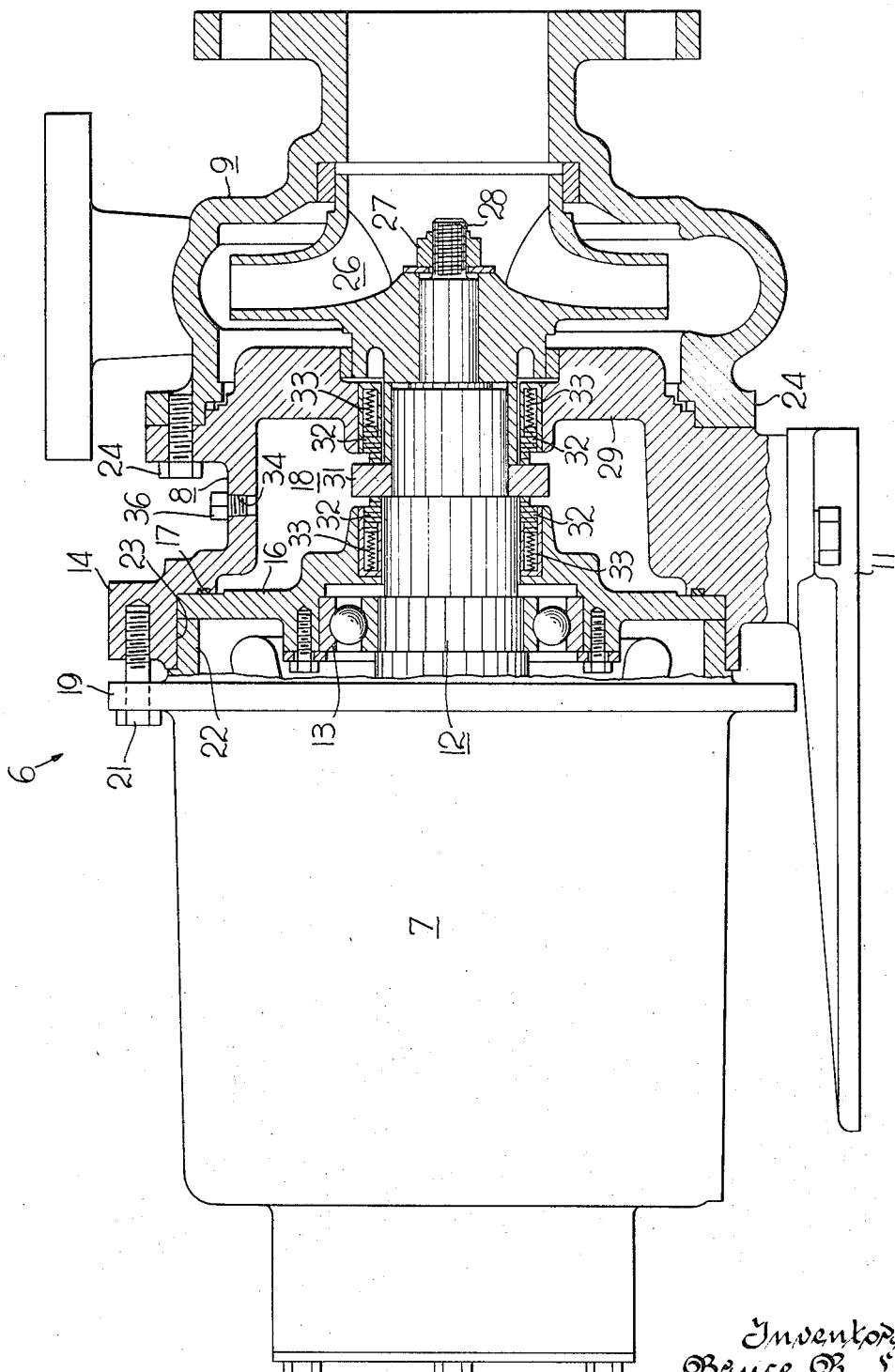

3,526,469
PUMP MOTOR SEAL SYSTEM
Bruce R. Lipe, Cincinnati, and Earle E. Schroeder, New Richmond, Ohio, assignors to Allis-Chalmers Manufacturing Company, Milwaukee, Wis.
Filed Dec. 10, 1968, Ser. No. 782,615
Int. Cl. F04d 29/00, 13/02; F16j 9/00
U.S. Cl. 417—360          1 Claim

ABSTRACT OF THE DISCLOSURE

An annular gastight chamber is provided between the pump and motor housings about the drive shaft. A mechanical spring-biased face seal is provided between the rotating shaft and the stationary housing within the gastight chamber. A lubricating liquid is provided in the seal chamber and the chamber is then pressurized with a gas and sealed at the factory. The pump housing and impeller may be removed or adjusted without destroying the pressure in the seal chamber.

---

This invention pertains in general to pumps and more particularly to a lifetime sealing arrangement for a pump.

Mechanical face seals have been developed to the point where for all practical purposes no leakage takes place. However, to insure such a high degree of sealing, the surfaces between the rotating and stationary parts of the seal require extremely accurate surfaces. Furthermore, in assembling the seal, it is extremely important that these surfaces be accurately aligned and perfectly clean. If the seal is not properly assembled, scoring of the contacting surfaces may result causing an imperfect seal. If the seal requires assembly in the field, it is quite likely the person assembling the seal is not highly skilled in this art. Therefore, frequently the seal is improperly assembled and it does not perform satisfactorily.

It is, therefore, the intention and general object of this invention to provide a seal which is assembled and adjusted at the factory and shipped for immediate use without requiring further adjustment in the field.

An additional object of the subject invention is to provide a pump having a seal housing thereon defining an annular seal chamber about the pump shaft which includes a mechanical face seal and a pressurized liquid gas combination to lubricate the seal and which chamber is completely isolated from the pump housing.

A further object of the subject invention is to provide a seal of the above-described type for a pump wherein the pump housing and impeller may be removed or adjusted without releasing the pressure from the seal chamber.

A more specific object of the subject invention is to provide a pump motor machine having a seal housing therebetween defining an annular seal chamber about the machine shaft which includes a mechanical face seal and a pressurized liquid gas combination to lubricate the seal and which chamber is completely isolated from the pump and motor housings.

These and other objects of the subject invention will become more fully apparent as the following description is read in light of the attached drawing which shows a pump motor machine partially in section and including a seal chamber constructed in accordance with the invention.

Referring to the drawing, the pump motor machine is indicated generally at 6 and comprises generally a motor housing 7, a seal housing 8 and a pump housing 9. It should be understood that while the invention will be described in connection with a close coupled pump motor machine, the invention is equally applicable to an arrangement where the motor is connected to the pump only through the pump shaft. A machine base 11 may be connected to the machine in any conventional manner and is herein shown bolted to the lower portion of the seal housing 8.

The seal housing 8 is substantially annular in configuration and is provided with a bore therethrough which receives a stepped drive shaft generally designated 12. The shaft 12 may be supported for rotation in a conventional ball bearing 13 supported in one wall of the seal housing 8. The other or remote end of the shaft 12 is supported in a similar ball bearing (not shown) mounted in the motor housing 7. In other than close coupled machines, an additional bearing would be provided in a separate bearing housing. As shown in the drawing for purposes of illustration, the left hand end of the seal housing 8 may be provided with an annular motor mounting flange 14 which defines an annular recess into which is fitted an end plate 16. The plate 16 has an annular machined surface which mates with an annular machined surface on the seal housing 8. An annular groove may be provided in either of these mating surfaces to receive an O ring 17 to insure a gastight seal between the plate 16 and the seal housing 8. The seal housing 8 and the plate 16 define an annular gastight chamber 18 about the shaft.

The motor housing 7 is connected to the seal housing 8 in any conventional way and is herein shown as including a mounting flange 19. This mounting flange has a plurality of circumferentially spaced holes therethrough which are alignable with threaded bores in the seal housing mounting flange 14. Bolts 21 connect the motor 7 to the seal housing 8. The motor housing 7 may be provided with an annular axially extending locating flange 22. This locating flange 22 fits into a groove 23 in the seal housing with a machine fit and the end thereof bears against the plate 16 in the vicinity of the O ring 17. As the bolts 21 are turned down the flange 22 bears against the plate 16 insuring a gastight seal between the plate and the seal housing about the O ring.

The pump housing 9 is connected to the other end of the seal housing 8 by means of circumferentially spaced bolts 24 passing through an annular rear wall 25 of the pump housing. A pump impeller 26 is supported for rotation within the housing 9 on the shaft 12. The pump impeller is connected to the shaft 12 in any conventional manner such as a nut 27 turned on to the threaded end 28 of the shaft. It should be noted that the pressure chamber 18 is completely isolated from the pump housing 9 and pump impeller 26 by an integral wall 29 of the seal housing 8. The annular rear wall 25 of the pump housing defines an opening of a diameter to permit the pump housing and impeller to be removed without releasing the pressure in the seal housing or disturbances the shaft seal.

An annular shoulder 31 is provided on the shaft and located within the seal chamber 18. This shoulder 31 is provided with oppositely disposed accurately machined and lapped surfaces. Both the plate 16 and the wall 29 of the seal housing 8 are provided with an annular bore about the shaft 12 and open to the shoulder 31. Identical mechanical face seals 32 are provided in each of these bores. Each mechanical seal comprises an annular seal element which is in sealing engagement with the shoulder 31 and which is biased by a plurality of circumferentially spaced springs 33.

The seal parts are accurately assembled at the factory insuring accurate face to face contact between the seal elements and the shoulder 31. A sealing and lubricating liquid is then admitted into the seal chamber 18 through the threaded opening 34. A pressurized gas is then admitted into the seal chamber 18 pressurizing this chamber to insure adequate lubrication of the contacting surfaces of the mechanical seal. A plug 36 is inserted into the opening 34 sealing the seal chamber 18. Once the chamber 18 is pressurized, no further adjustment of the mechanical seal is required. Furthermore, as previously mentioned, the pump housing 9 may be removed to adjust the impeller 26 without affecting in any way either the pressure in the chamber 18 or the mechanical seals 32.

Although only one embodiment of the subject invention has been herein shown and described, other embodiments will be apparent to those skilled in the art after reading this description, and it is intended that all such embodiments as come within a reasonable interpretation of the appended claim be covered.

The embodiments of the invention in which an exclusive property or privilege is claimed are defined as follows:

1. A motor and pump combination comprising: a seal housing having an annular peripheral wall defining a rearwardly facing opening and a front wall having a shaft bore therethrough; walls defining an annular sealing shoulder about said rearwardly facing opening; a motor housing having a front plate with a shaft bore therethrough, said front plate having an annular peripheral sealing surface adapted for mating sealing engagement with said sealing shoulder; means attaching said motor housing to said seal housing with motor front plate closing said opening and said sealing surface engaging said sealing shoulder and providing a fluid tight seal therebetween, said motor front plate shaft bore being in axial alignment with said seal housing front wall shaft bore; a pump housing defining a pumping chamber and a rearwardly directed opening having a first diameter; means removably attaching said pump housing to said seal housing, said front wall of said seal housing closing said opening in the pump housing; a motor shaft extending through said aligned shaft bores and terminating in said pumping chamber; a pump impeller having a diameter less than said first diameter attached to said motor shaft and operably positioned in said pumping chamber; shaft sealing means attached to said seal housing front wall and said motor housing front plate and engaging said motor shaft to provide a seal therebetween; and a noncirculating pressurized sealing fluid trapped in said seal housing between the shaft sealing means.

References Cited

UNITED STATES PATENTS

| | | | |
|---|---|---|---|
| 2,418,194 | 4/1947 | Piccardo | 277—62 |
| 2,427,656 | 9/1947 | Blom | 103—111 |
| 2,492,141 | 12/1949 | Gaylord | 103—111 |
| 3,301,191 | 1/1967 | Warren | 277—62 |

FOREIGN PATENTS 931,871   7/1963   Great Britain.

HENRY F. RADUAZO, Primary Examiner

U.S. Cl. X.R.

277—62; 417—372, 423